United States Patent
Breternitz

(10) Patent No.: US 10,019,365 B2
(45) Date of Patent: Jul. 10, 2018

(54) ADAPTIVE VALUE RANGE PROFILING FOR ENHANCED SYSTEM PERFORMANCE

(71) Applicant: Advanced Micro Devices, Inc., Sunnyvale, CA (US)

(72) Inventor: Mauricio Breternitz, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 15 days.

(21) Appl. No.: 15/130,793

(22) Filed: Apr. 15, 2016

(65) Prior Publication Data

US 2017/0212837 A1 Jul. 27, 2017

Related U.S. Application Data

(60) Provisional application No. 62/286,618, filed on Jan. 25, 2016.

(51) Int. Cl.
*G06F 12/08* (2016.01)
*G06F 12/0831* (2016.01)
(Continued)

(52) U.S. Cl.
CPC ........ *G06F 12/0833* (2013.01); *G06F 3/0611* (2013.01); *G06F 3/0647* (2013.01); *G06F 3/0653* (2013.01); *G06F 3/0685* (2013.01); *G06F 12/0802* (2013.01); *G06F 12/1009* (2013.01); *G06F 12/122* (2013.01); *G06F 12/128* (2013.01); *G06F 2212/621* (2013.01);
(Continued)

(58) Field of Classification Search
CPC ............. G06F 12/0833; G06F 12/1009; G06F 12/128; G06F 11/3466; G06F 11/3471; G06F 11/3476
See application file for complete search history.

(56) References Cited

U.S. PATENT DOCUMENTS

2010/0169602 A1* 7/2010 Hulbert ............... G06F 12/0246
711/165
2012/0124323 A1 5/2012 Lu et al.
(Continued)

OTHER PUBLICATIONS

Ramos, L., et al., "Page Placement in Hybrid Memory Systems," ICS'11, May 31-Jun. 4, 2011, Tuscon, Arizona, ACM, 2011, pp. 85-95.

(Continued)

*Primary Examiner* — Edward J Dudek, Jr.
(74) *Attorney, Agent, or Firm* — Zagorin Cave LLP

(57) ABSTRACT

Enhanced adaptive profiling of ranges of values in a stream of events includes identifying a set of contiguous ranges of the values and corresponding access frequencies in the stream of events. The enhanced adaptive profiling uses a merge threshold value and a split threshold value. The set of contiguous ranges spans an entire range space of the values. Periodic traversal of the set of contiguous ranges of values and corresponding access frequencies identifies a target set of ranges of the values having corresponding access frequencies above a predetermined threshold access frequency. The target set of ranges of values has a total number of ranges less than or equal to a predetermined number of ranges. The target ranges of values span at least some of the entire range space of values. A first operation uses the target set of ranges of values.

18 Claims, 6 Drawing Sheets

(51) Int. Cl.
*G06F 12/1009* (2016.01)
*G06F 12/128* (2016.01)
*G06F 3/06* (2006.01)
*G06F 12/0802* (2016.01)
*G06F 12/122* (2016.01)

(52) U.S. Cl.
CPC .... *G06F 2212/651* (2013.01); *G06F 2212/69* (2013.01)

(56) References Cited

U.S. PATENT DOCUMENTS

| | | |
|---|---|---|
| 2012/0137075 A1 | 5/2012 | Vorbach |
| 2013/0185475 A1 | 7/2013 | Talagala et al. |
| 2015/0169227 A1* | 6/2015 | Dickey ............... G06F 12/0223 711/153 |

OTHER PUBLICATIONS

International Search Report and Written Opinion in PCT/US2017/013934 dated Apr. 19, 2017, 8 pages.
Conway, P., et al., "Cache Hierarchy and Memory Subsystem of the AMD Opteron Processor," IEEE Computer Society, Micro, Mar./Apr. 2010, pp. 16-29.
Karakostas, V., et al., "Redundant Memory Mappings for Fast Access to Large Memories," ISCA '15, Jun. 13-17, 2015, ACM, 13 pages.
Lameter, C., "NUMA (Non-Uniform Memory Access): An Overview," ACM Queue, Aug. 9, 2013, vol. 11, Issue 7, pp. 1-12.
Mysore, S., et al., "Profiling over Adaptive Ranges," In Proceedings of the 4th Annual International Symposium on Code Generation and Optimization (CGO), Mar. 2006, pp. 1-12.
Lipasti, M., and Shen, J., "Exceeding the Dataflow Limit via Value Prediction," Proceedings of the 29th Annual ACM/IEEE International Symposium on Microarchitecture, Dec. 2-4, 1996, 12 pages.

* cited by examiner

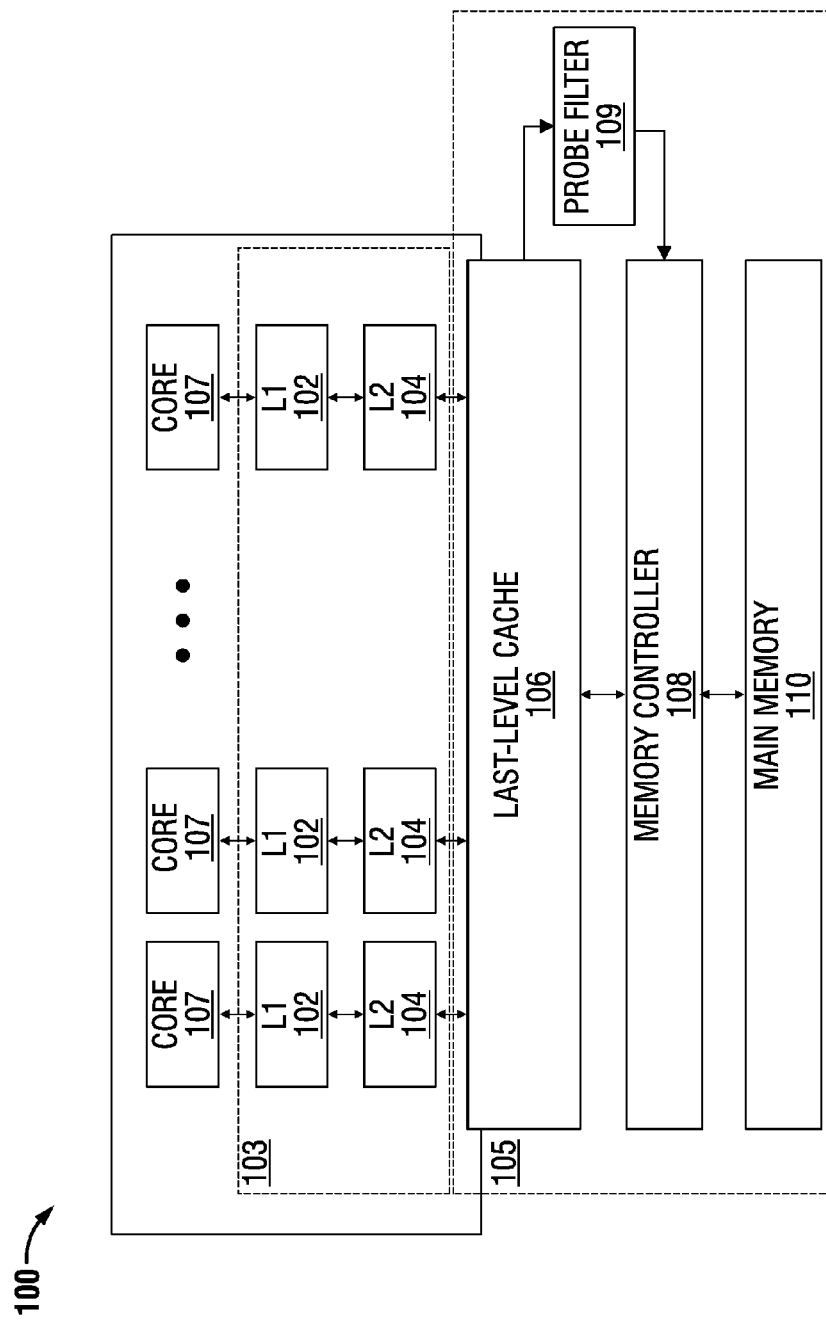

ADAPTIVE VALUE RANGE PROFILING FOR ENHANCED SYSTEM PERFORMANCE

CROSS-REFERENCE TO RELATED APPLICATION(S)

This application claims the benefit under 35 U.S.C. § 119(e) of U.S. Provisional Application No. 62/286,618, filed Jan. 25, 2016, entitled "REGION MIGRATION CACHE" by Patrick N. Conway, et al., which application is hereby incorporated by reference.

BACKGROUND

Field of the Invention

The invention is related to computing systems and more particularly to computing systems using value range classification.

Description of the Related Art

Conventional value range classification systems count accesses to values in a stream of events and dynamically determine frequencies of accesses to ranges of values. However, the number of ranges used by such systems may require substantial amounts of high bandwidth storage locations that may be prohibitively expensive to implement in actual systems. Accordingly, improved techniques for utilizing value range classification systems are desired.

SUMMARY OF EMBODIMENTS OF THE INVENTION

In at least one embodiment of the invention, a method includes adaptively profiling ranges of memory addresses in a stream of memory requests in a processing system to identify a set of contiguous ranges of the memory addresses and corresponding access frequencies in the stream of memory requests. The adaptively profiling is based on a merge threshold value and a split threshold value. The set of contiguous ranges span an entire range space of the memory addresses. The merge threshold value indicates a minimum access frequency for each range of memory addresses in the set of contiguous ranges of memory addresses. The split threshold value indicates a maximum access frequency for each range of memory addresses in the set of contiguous ranges of memory addresses.

The method includes periodically traversing the set of contiguous ranges of memory addresses and corresponding access frequencies to identify a target set of ranges of the memory addresses having corresponding access frequencies above a predetermined threshold access frequency. The target set of ranges of memory addresses have a total number of ranges less than or equal to a predetermined number of ranges. The target ranges of memory addresses span at least some of the entire range space of memory addresses. The method includes performing a first operation using ranges of memory addresses in the target set of ranges of memory addresses. The target set of ranges of memory addresses may span less than the entire range space of memory addresses. The target set of ranges of memory addresses may include non-contiguous ranges of the memory addresses. The memory addresses may be virtual memory addresses and the first operation may include virtual-to-physical memory address translation of the target set of ranges of the memory addresses into a set of physical address ranges determined based on a base address value and a limit value. The first operation may further include storing the set of physical address ranges as corresponding base address value and limit value pairs in a set of base-limit registers. The predetermined number of ranges may correspond to a total number of base-limit registers in the set of base-limit registers.

The memory addresses may be virtual memory addresses and the first operation may include converting consecutive ranges of the target set of ranges of the memory addresses into address ranges for large pages of memory. The first operation may include allocating contents of main memory associated with the target ranges of memory addresses to a high-bandwidth memory in a multilevel memory system. Performing the first operation may include identifying multiple memory requests to a memory address by multiple requestors and executing a coherence operation in response to the multiple requests. Executing the coherence operation may include invalidating a cache line corresponding to the memory address.

In at least one embodiment of the invention, an apparatus includes an adaptive range profiler configured to adaptively profile ranges of memory addresses in a stream of memory requests in a processing system to identify a set of contiguous ranges of the memory addresses and corresponding access frequencies in the stream of memory requests. The adaptively profiling is based on a merge threshold value and a split threshold value. The set of contiguous ranges spans an entire range space of the memory addresses. The merge threshold value indicates a minimum access frequency for each range of memory addresses in the set of contiguous ranges of memory addresses. The split threshold value indicates a maximum access frequency for each range of memory addresses in the set of contiguous ranges of memory addresses. The apparatus includes range coalescing and culling logic configured to periodically traverse the set of contiguous ranges of memory addresses and corresponding access frequencies to identify a target set of ranges of memory addresses having corresponding access frequencies above a predetermined threshold access frequency. The target set of ranges of memory addresses has a total number of ranges less than or equal to a predetermined number of ranges and the target ranges of memory addresses span at least some of the entire range space of memory addresses. The apparatus includes logic configured to perform a first operation using ranges of memory addresses in the target set of ranges of memory addresses. The target set of ranges of memory addresses may span less than the entire range space of memory addresses and the target set of ranges of memory addresses may include non-contiguous ranges of the memory addresses.

The logic may include a virtual-to-physical address translator configured to perform the first operation including translation of the target set of ranges into a set of physical addresses having a base memory address and a limit value. The logic may further include a set of base-limit registers configured to store the set of physical address ranges. The predetermined number of ranges may correspond to a total number of base-limit registers in the set of base-limit registers. The apparatus may include a page table including memory mappings redundant to the memory mappings of the set of base-limit registers. The logic may include a virtual-to-physical address translator configured to perform the first operation including translation of consecutive ranges of the target set of ranges into addresses for large pages of memory. The apparatus may include a high-bandwidth memory. The first operation may include allocating contents of main memory associated with the target ranges of memory addresses to the high-bandwidth memory. The logic may be configured to identify multiple memory requests to a memory address by multiple requestors and execute a coherence operation in response to the multiple requests.

In at least one embodiment of the invention, a method includes adaptively profiling ranges of data values in a stream of events in a processing system to identify a set of contiguous ranges of the data values and corresponding access frequencies in the stream of events. The adaptively profiling is based on a merge threshold value and a split threshold value. The set of contiguous ranges spans an entire range space of the data values. The merge threshold value indicates a minimum access frequency for each range of data values in the set of contiguous ranges of data values. The split threshold value indicates a maximum access frequency for each range of data values in the set of contiguous ranges of data values. The method includes periodically traversing the set of contiguous ranges of data values and corresponding access frequencies to identify a target set of ranges of the data values having corresponding access frequencies above a predetermined threshold access frequency. The target set of ranges of data values has a total number of ranges less than or equal to a predetermined number of ranges and the target ranges of data values spans at least some of the entire range space of data values. The method includes performing a first operation using ranges of data values in the target set of ranges of data values. The target set of ranges of data values may span less than the entire range space of data values and the target set of ranges of data values may include non-contiguous ranges of the data values. The stream of events may be a stream of memory requests and the data values may be memory addresses. The stream of events may be a stream of control flow instructions, the data values may be target program addresses and performing the first operation may include predicting a target for a corresponding control flow instruction. The stream of events may be a stream of data computation instructions, the data values may be data operands, and performing the first operation may include predicting a value of an output of a data computation based on one or more data operands.

BRIEF DESCRIPTION OF THE DRAWINGS

The present invention may be better understood, and its numerous objects, features, and advantages made apparent to those skilled in the art by referencing the accompanying drawings.

FIG. 8 illustrates a functional block diagram of an exemplary processing system.

The use of the same reference symbols in different drawings indicates similar or identical items.

DETAILED DESCRIPTION

Figure 1:
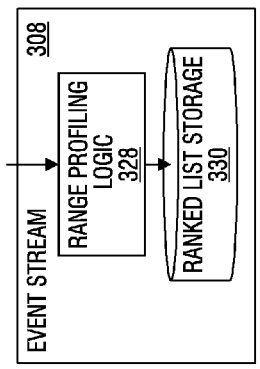
FIG. 1 illustrates a functional block diagram of an exemplary value range profiler consistent with at least one embodiment of the invention.

Referring to FIG. 1, an exemplary value range profiler 308 includes range profiling logic 328 that generates a ranked list of value ranges that spans the entire range of possible values (e.g., based on memory address width, operand width, or program counter width). Range profiling logic 328 stores the value ranges and corresponding frequencies of accesses in ranked list storage 330. In at least one embodiment, value range profiler 308 implements a streaming one-pass technique to hierarchically classify values into ranges according to the frequency of their occurrence in the event stream. Value range profiler 308 classifies more frequently accessed value ranges into more precise sub-ranges. As value range profiler 308 analyzes more events, it may either split sub-ranges into further sub-ranges or merge sub-ranges together to form larger value ranges due to sparsely accessed value ranges. Value range profiler 308 stores the information gathered from the entire event stream in one pass with a relatively small, finite amount of memory. Value range profiler 308 may generate the ranked list as a profile tree of ranges stored as a data array in a memory including each value range and an associated counter. Value range profiler 308 includes enhancements that improve performance of conventional adaptive range profiling techniques by adapting the precision of the value ranges to high access frequency range values and to fixed storage sizes as described further below.

Figure 2:
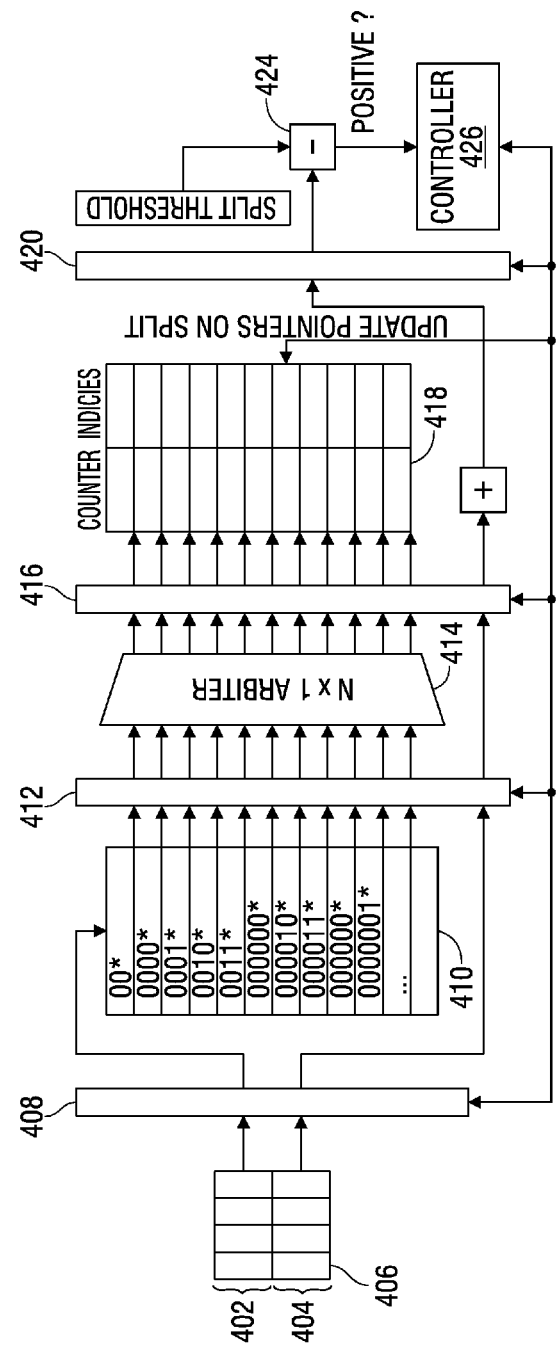
FIG. 2 illustrates a functional block diagram of exemplary value range profiling logic.

An exemplary architecture for a pipelined implementation of range profiling logic 328 is illustrated in FIG. 2. Buffer 406 receives a stream of events (e.g., memory requests, arithmetic instructions, or program control instructions) and stores frequency 404, the number of times an associated value 402 has been observed since it was previously observed by range profiling logic 328. Buffer 406 enters those events into the pipeline. In at least one embodiment, buffer 406 pre-processes events and combines events having identical values. Range matcher 410 identifies value ranges that match the value in a particular received event. Arbiter 414 identifies the smallest range that includes the value, causing counters 418 to update one or more counters for one or more corresponding value ranges. Each update of a profile data structure (e.g., tree) is independent from a previous update, except for actual counter increments.

Buffer 406 stores incoming events until they are processed. In response to a range merge indicator (e.g., periodically, but at exponentially decreasing frequency), controller 426 stalls the pipeline while searching the counters for potential merge ranges. Range splits and range merges create inter-event dependencies that must be satisfied before processing more events. However, substantially fewer range splits and range merges occur than the number of events, thus relatively few stalls occur and stalls have negligible impact on performance. Controller 426 may split value ranges or merge value ranges which cause stalls in the pipeline of range profiling logic 328, e.g., controller 426 prevents pipeline registers 408, 412, 416, and 420 from updating. During this time, events may queue up in buffer 406 for later processing. In the event of a range split, controller 426 initiates a pipeline flush and resets range profiling logic 328 to a state directly prior to the state where the range split should have occurred.

For each event processed from buffer 406, controller 426 searches for a set of value ranges that includes the corresponding value of the event. This operation may be performed using ternary content-addressable memory cells 410. Ternary content-addressable memory cells 410 set the appropriate match lines high for all value ranges that match the value. In at least one embodiment, each cell includes most significant bits of values that correspond to a range of values. The fewer bits stored in the cell, the larger the corresponding range of values. Likewise, the greater number of bits stored in the cell, the smaller the corresponding range of values. By sorting the entries of ternary content-addressable memory cells 410 by prefix length, controller 426 may determine the smallest range, which has the longest prefix. Note that a value will match two different entries of ternary content-addressable memory cells 410 having the same range width. In at least one embodiment, ternary content-addressable memory cells 410 are further pipelined to observe individual nibbles or individual bytes for each comparison.

After range profiling logic 328 matches a value of an event to one or more value ranges, range profiling logic 328 identifies the longest prefix of the matching value ranges, which may correspond to the last matching entry of ternary content-addressable memory cells 410. If ternary content-addressable memory cells 410 stores N match lines in order and are sorted by prefix length, N×1 arbiter 414 gives highest priority to the longest matches and allows only one matching value range to proceed. The output of the highest priority line triggers the word line of a corresponding counter. Note that although embodiments of range profiling logic 328 use ternary content-addressable memory cells 410 and a branching factor of b, the range profiling logic 328 may be a multi-bit tree and may use other techniques to build high speed implementations based on other network algorithms.

After identifying the smallest range match (i.e., the most precise value range), range profiling logic 328 updates the appropriate counter of counters 418. In at least one embodiment, counters 418 include one read port and one write port, which are sufficient to handle a continuous stream of events to the array. A split handling stage compares the result of the updated counter with a predetermined range split threshold using comparator 424. If the counter exceeds the range split threshold, then controller 426 expands the node to have multiple children (e.g., four children where branching factor b=4), and initializes counters of each of the children to have a zero count. Separate storage elements may store the range split threshold and a range merge threshold, although they may have the same value and may use only one storage element. The threshold value may be recomputed based on one or more corresponding predetermined values whenever the number of events n changes. Range profiling logic 328 may perform computation in parallel with other operations since it depends only on the number of events n and some predetermined values. If controller 426 causes a value range split, then range profiling logic 328 may flush the pipeline to properly account for new nodes.

In at least one embodiment, range profiling logic 328 begins with a root node in a range tree that spans the entire value range. As the associated system streams more events, the value range profiling technique determines whether tree nodes should be split into child nodes by comparing counter values associated with a particular tree node to a predetermined split threshold value. The predetermined split threshold value may be selected according to a maximum range of the values, height of the tree, the number of events processed and/or a user-defined error threshold ϵ. If the counter value exceeds the predetermined range split threshold value, the adaptive range profiling technique splits the tree node into child nodes. The adaptive range profiling technique determines the number of child nodes resulting from the split based on a predetermined branching factor. The higher the predetermined branching factor, the more precise the resulting profile. However, increased numbers of child nodes have the disadvantage of requiring additional memory overhead.

In at least one embodiment of range profiling logic 328, a value range split requires making new entries in ternary content-addressable memory cells 410 and memory data array for the tree data structure. Controller 426 generates new children nodes and inserts corresponding identifiers into ternary content-addressable memory cells 410 with the ranges set appropriately, each spanning a portion of the parent range. Controller 426 inserts corresponding entries into memory storing the counter and other information of the newly created nodes of the tree data structure. A split node may be either a leaf node or a parent node. If the node is a leaf node, then the split operation includes setting a pointer from the parent to the newly created children. If the node is already a parent node, but its children do not cover the entire range of the parent (e.g., after an internal range merge), then the split also includes an additional operation that identifies the new parent of the existing children and setting the children pointers.

Controller 426 may handle range merge operations individually or in batches. Controller 426 may periodically initiate batch range merges. In each batch of range merges, controller 426 scans ternary content-addressable memory cells 410 bottom-up to identify candidate nodes for range merger. Controller 426 then deletes corresponding data array entries in memory. A recursive operation prunes the range profile data structure to provide compacted profile information. Although the required memory size may be determined experimentally, it may be bounded in some applications. A split threshold may be set such that as soon as a node counts a number of events more than a proportion of total events, the node splits into sub-ranges. Similarly, a range merge does not merge ranges that have high enough access frequencies to justify precise profiling. Thus the adaptive range profiling technique ensures profiling with the smallest ranges possible.

Figure 3:
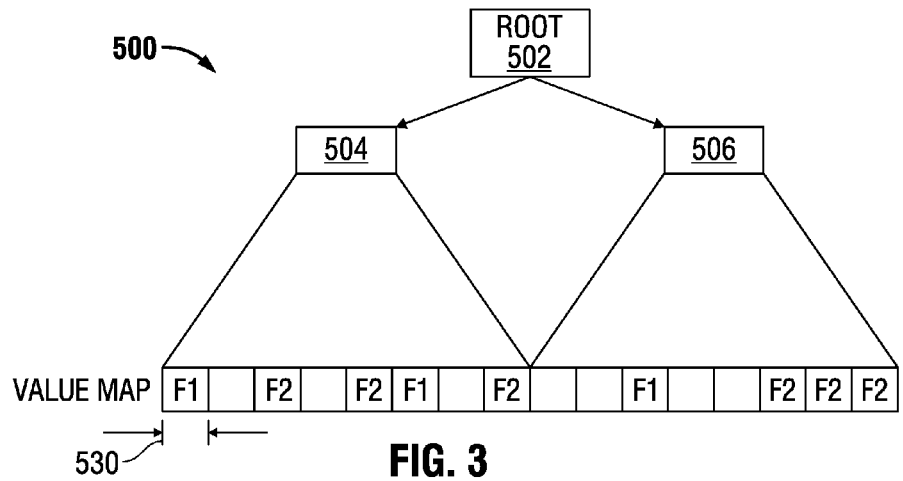
FIG. 3 illustrates a state diagram of an exemplary state of the value range profiler.
Figure 4:
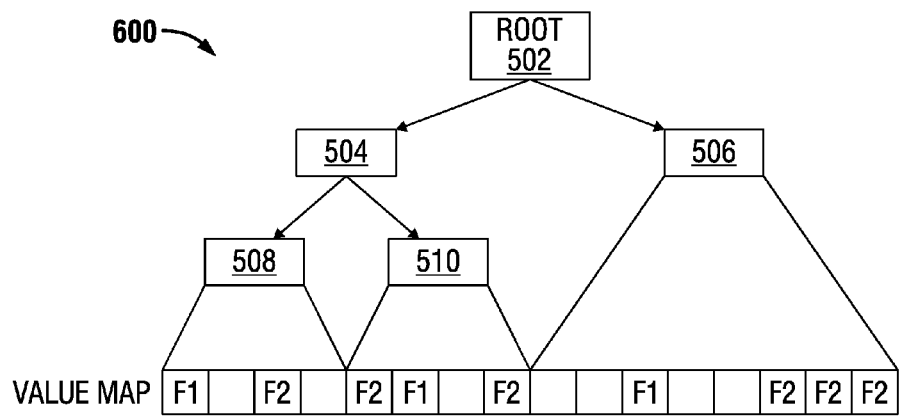
FIG. 4 illustrates a state diagram of an exemplary state of the value range profiler after a split operation.
Figure 5:
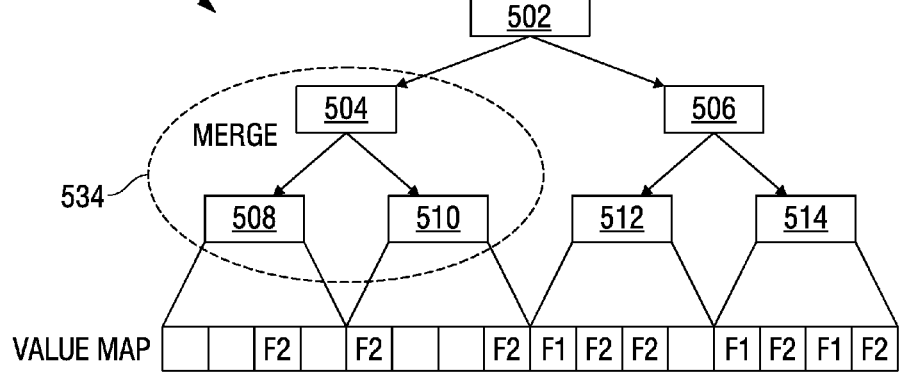
FIG. 5 illustrates a state diagram of an exemplary state of the value range profiler prior to a merge operation.

Referring to FIGS. 3, 4, and 5, value ranges labeled F1 have access frequencies of at least F1 and represent high access frequency ranges. The value ranges labeled F2 have access frequencies of at most F2 and represent low access frequency ranges. FIG. 3 illustrates an exemplary adaptive range profiling tree with child nodes 504 and 506 of root node 502. As the event stream is observed, range profiling logic performs a value range split operation, which splits the high access frequency ranges of node 504 into child nodes 508 and 510, as shown in FIG. 4. When range profiling logic splits a value range, the range profiling logic also splits the value ranges of the profiling tree. These new branches maintain a more accurate set of counters for these high access frequency ranges.

The value range profiling technique also merges nodes to limit the number of nodes in the value range profiling tree in response to the high access frequency range changing to a low access frequency range. The value range profiling technique merges these nodes into their parent node, thereby reducing the need for precise counters for these less important ranges. FIG. 5 illustrates an exemplary merge operation 534 that merges child node 508 and child node 510 into node 504, since the corresponding value ranges have become low access frequency ranges. The resultant node counter has a count equal to the sum of the counter values of nodes 508 and 510. An exemplary event profiler using the adaptive range profiling technique may include any suitable number of counters, e.g., 256 counters. The adaptive range profiling tree size is related to the workload footprint size, event value patterns and error threshold. The adaptive range profiling technique effectively and efficiently uses counters, which are implemented using memory locations.

The ranked list generated by the value range profiling technique described above spans the entire value space, may include ranges of values that are not useful for a target application, and may include too many ranges of values for processing in a target application. Accordingly, an enhanced value range profiling technique periodically culls and coalesces the profiled ranges of values of the ranked list to generate a target set of value ranges for a target application. For example, the target set of value ranges may include only value ranges having access frequencies greater than a predetermined threshold for use in a first operation. The target application may apply a default operation to those value ranges not included in the target set of value ranges. Another target set of value ranges may include only value ranges having access frequencies less than a predetermined threshold for use in a second operation. This enhanced value range profiling technique may improve utilization of resources in the target application as being focused on value ranges having high access frequencies or otherwise focused value ranges.

Figure 7:
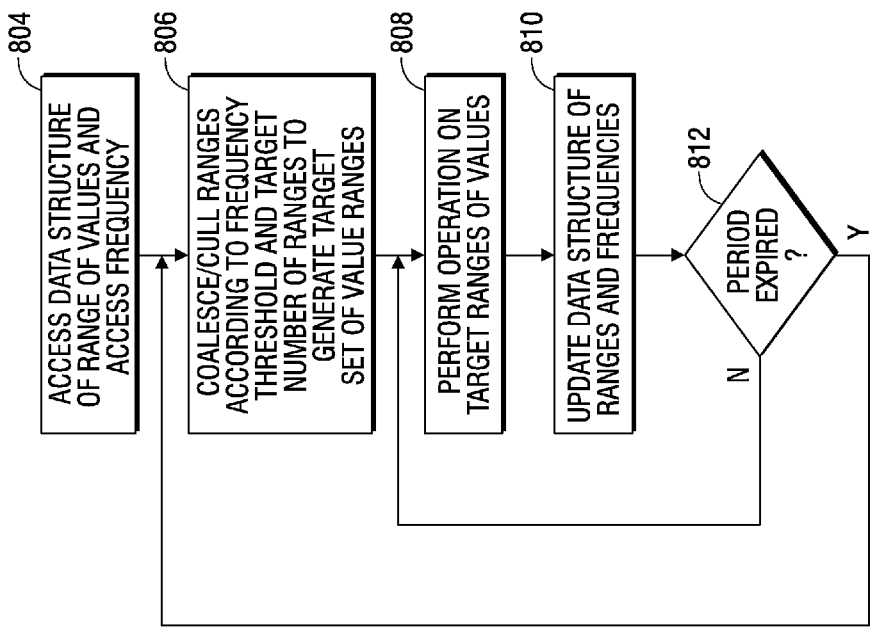
FIG. 7 illustrates an information and control flow for a system using enhanced value range profiling consistent with at least one embodiment of the invention.
Figure 6:
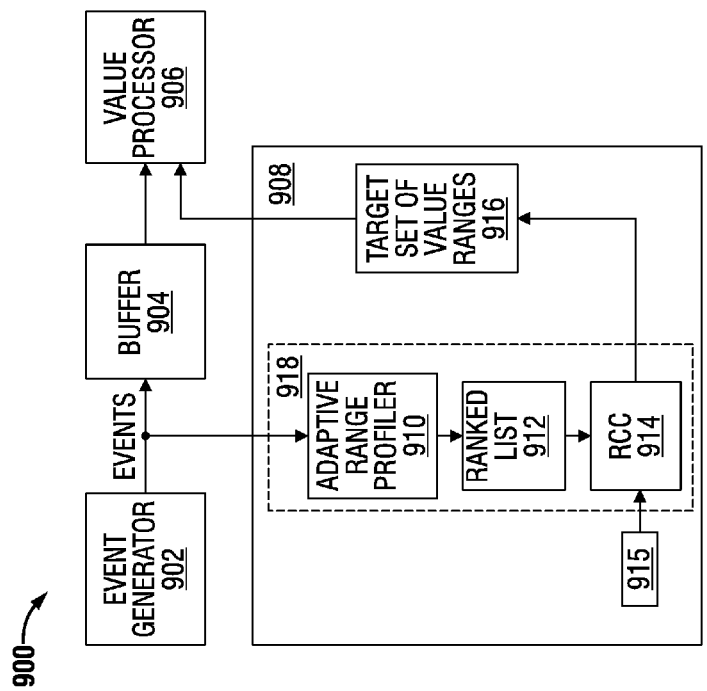
FIG. 6 illustrates a functional block diagram of an exemplary system using enhanced value range profiling consistent with at least one embodiment of the invention.

Referring to FIGS. 6 and 7, in at least one embodiment of the enhanced value range profiling technique 900, event generator 902 generates a stream of events including values of a particular type (e.g., memory address, data operands, or program counter values), which may be stored in pipeline buffer 904 for use by value processor 906. Adaptive range profiler 910 observes the values in the stream of events and generates ranked list 912, which includes a ranked list of value ranges and corresponding access frequencies that spans the entire value space of values (e.g., range space based on entire memory address width, data operand width, or program counter width). Ranked list 912 includes N value ranges, where N is a predetermined integer.

Range coalescing and culling logic (RCC) 914 periodically selects value ranges for inclusion in target set of value ranges 916 based on at least one access frequency threshold value and a target range set size M stored in registers 915, where M is a predetermined integer, M≤N. Range coalescing and culling logic 914 processes ranked list 912 and generates target set of value ranges 916 (step 804 in FIG. 7). Range coalescing and culling logic 914 merges and/or eliminates ranges of values based on the corresponding merge and split thresholds (e.g., stored in registers 915) to generate target set of value ranges 916, which has a predetermined size that may be smaller than ranked list 912, but may store more precise ranges than ranked list 912 (step 806 in FIG. 7).

Value processor 906 uses the target set of value ranges 916 to perform a target operation, e.g., implemented by value processor 906 (step 808 in FIG. 7). Meanwhile, adaptive range profiler 910 continues to update ranked list 912 according to the stream of events. If a predetermined period has expired (step 812 in FIG. 7), value processor 906 continues to process the ranges of values in the target set of value ranges 916 (step 808 in FIG. 7) and adaptive range profiler 910 updates ranked list 912, without updating target set of value ranges 916. In response to expiration of the predetermined period (step 812 in FIG. 7), range coalescing and culling logic 914 updates target set of value ranges 916 by splitting, merging and/or eliminating ranges of values in the updated version of ranked list 912 based on a predetermined access frequency threshold, merge threshold, split threshold, and/or target number of ranges stored in registers 915 to generate target set of value ranges 916 (step 806 in FIG. 7). A predetermined split threshold indicates a maximum access frequency for each range of ranked list 912. If the access frequency of an address range is greater than the split threshold value, then range coalescing and culling logic 914 may split the range into multiple ranges. A merge threshold indicates a minimum access frequency for each range of the ranked list 912. If the access frequency of an address range associated is less than the merge threshold value, range coalescing and culling logic 914 may merge these ranges, thereby reducing the need for precise counters for less important ranges. Range coalescing and culling logic 914 may be configured according to different objectives in a target application. For example, range coalescing and culling logic 914 may be configured with predetermined values for the access frequency threshold, merge threshold, split threshold, and/or target number of ranges to maximize region size, reduce a total number of regions, or minimize a number of values estimated to be outside a subset of the ranges (e.g., in redundant mapping applications).

Referring to FIGS. 6 and 8, in at least one embodiment, events of the enhanced profiling technique are memory requests to main memory 110 filtered by a multi-level caching system of processing system 100. Processing system 100 includes multiple processing nodes (e.g., node 0, node 1, node 2, and node 3) and a multi-level memory system. Each of the nodes can access its own memory or memory in another node. Probe filter 109 or other coherence mechanism may provide interprocessor communication to maintain coherency of the memory image when more than one cache contains the contents of the same location of main memory (e.g., level-two caches of core 0, core 1, core 2, and core 3 of processor 102) of coherence domain 103. Event generator 902 of FIG. 6 is last-level cache 106 of FIG. 8. Last-level cache 106 provides a stream of memory accesses to memory controller 108. Enhanced value range profiler 908 is included in memory controller 108, which is coupled between last-level cache 106 and main memory 110.

Figure 9:
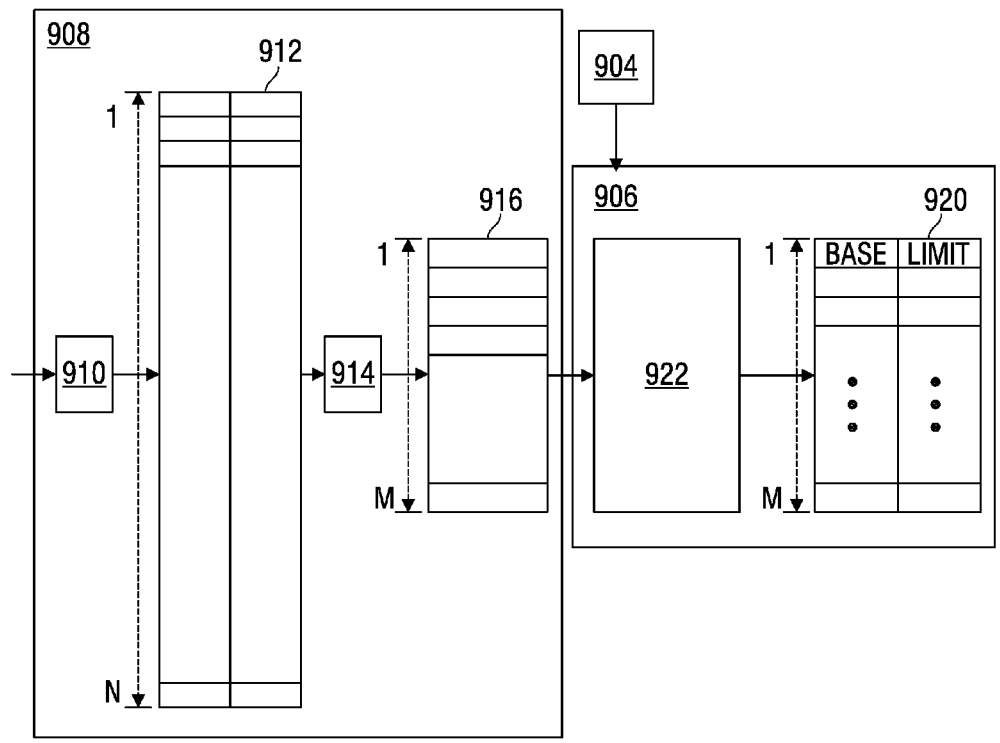
FIG. 9 illustrates a functional block diagram of a portion of an exemplary system using enhanced value range profiling consistent with at least one embodiment of the invention.

Referring to FIGS. 6, 8, and 9 in an exemplary embodiment, buffer 904, value processor 906, and enhanced value range profiler 908 are included in memory controller 108 of processing system 100. Enhanced value range profiler 908 receives memory requests from last-level cache 106 as events including memory addresses as values. Value processor 906 includes circuitry that maps virtual memory addresses to physical memory addresses.

Page-based implementations of virtual memory divide main memory 110 into fixed-size pages. A conventional memory controller may use a page table to map virtual pages to physical pages of a fixed size and accelerate address lookup using a content-addressable memory or translation lookaside buffer. In general, a translation lookaside buffer is a cache that is used to speed up memory translation. The translation lookaside buffer stores recent translations of virtual memory addresses to physical memory addresses for faster retrieval. In response to a virtual address, the translation lookaside buffer produces a physical address. The translation lookaside buffer may have a multi-level structure and may store translations for pages of different sizes (e.g., standard pages of 4 KB ($2^{12}$ bytes) or large pages (e.g., pages of 2 MB ($2^{21}$ bytes) or other page size substantially larger than a standard page size and which may also be referred to as "huge pages" or "super pages"). In at least one embodiment, the target set of value ranges 916 and value processor 906 are used in a range translation lookaside buffer in addition to, or instead of, a translation lookaside buffer for a page-based memory system.

A range translation lookaside buffer is a hardware cache that holds multiple range translations. Each entry maps a range of contiguous virtual pages to contiguous physical pages. Each range can have a different size. The range translation lookaside buffer may be fully associative and each entry includes a virtual range and range address translation. The virtual range may be stored as the BASE and LIMIT of the virtual address range map. The translation may store an OFFSET that holds the start of the range in physical memory minus the BASE. However, the limited reach of a range translation lookaside buffer may increase latency of address translation, which may be detrimental to memory access latency.

Figure 11:
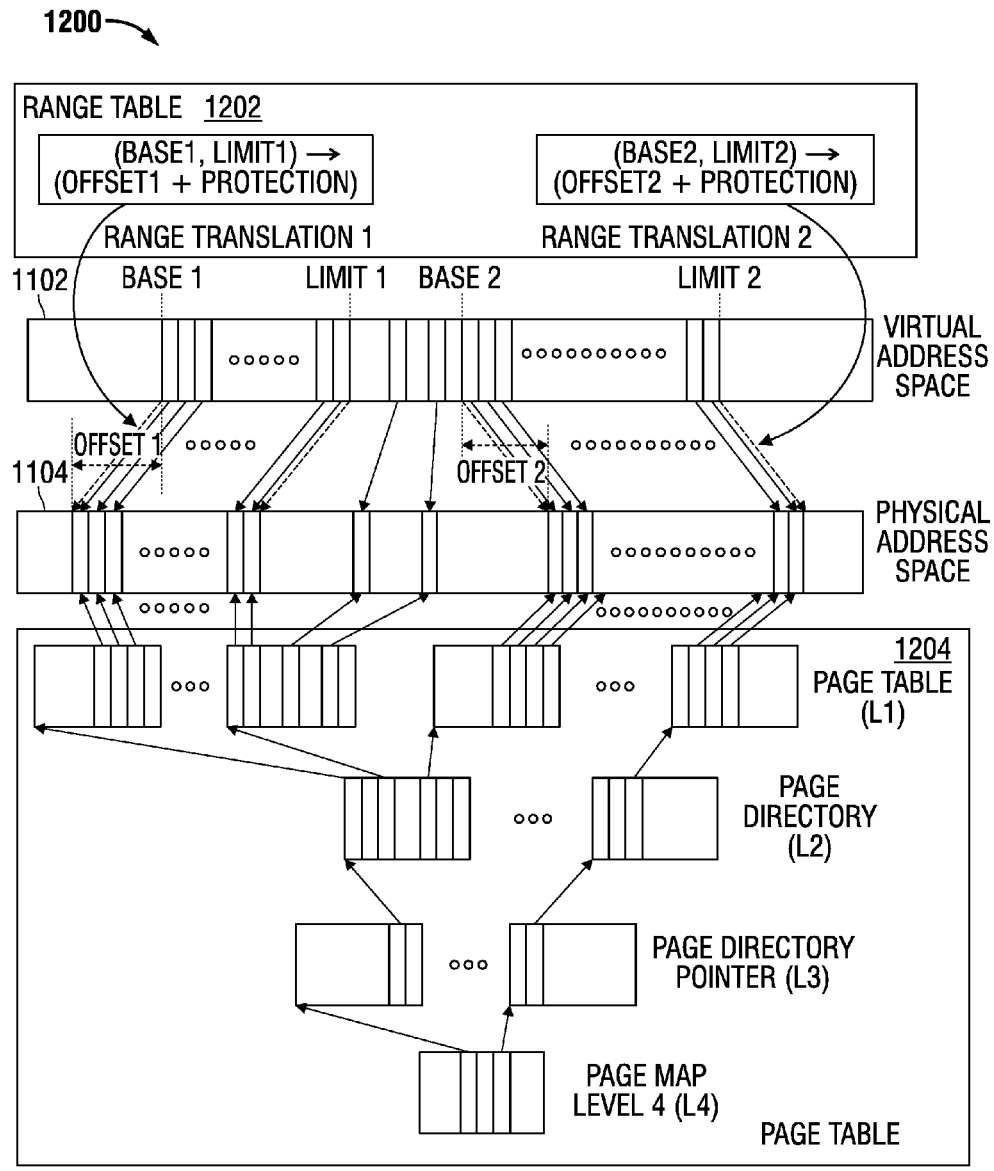
FIG. 11 illustrates a functional block diagram of an exemplary redundant memory mapping system.

A technique for reducing memory access latency includes address translator 922 translating the virtual address ranges stored in target set of value ranges 916 into physical memory address ranges stored in base-limit registers 920. For example, address translator 922 maps between address ranges for contiguous virtual pages to address ranges for contiguous physical pages. The range translation may be base-page-aligned and may be identified by BASE and LIMIT fields of base-limit registers 920. Referring to FIG. 11, in at least one embodiment address translator 922 translates a virtual range address of virtual address space 1102 to a physical range address of physical address space 1104. The translation may include adding an offset to a virtual base address of a corresponding range and limiting the range of the physical address by a value in an associated LIMIT field.

Referring back to FIG. 9, since an exemplary memory system includes base-limit registers 920 having a predetermined number of elements, enhanced value range profiler 908 reduces the number of ranges from size N of ranked list 912, which includes virtual memory address ranges and corresponding access frequencies that span the entire virtual address space as generated by the range adaptive profiling technique, to target number of ranges M that may be stored in M elements of base-limit registers 920. By storing only memory address ranges that are accessed with a frequency greater than a particular threshold in base-limit registers 920, the enhanced value range profiling technique increases range precision including a hit rate of base-limit registers 920, and decreases latency of a virtual-to-physical address translation, thereby improving performance of the associated processing system. Note that M≤N and base-limit registers 920 may include non-contiguous virtual address ranges that may span only portions of the virtual memory address space, e.g., those virtual address ranges accessed with substantial frequency above a predetermined threshold value. Accordingly, the enhanced value range profiling technique may be used to improve performance of memory address translation applications that exhibit contiguity in accesses to virtual memory address space and improves precision of the ranges used to represent those contiguous virtual memory addresses in a storage space of limited size.

Figure 10:
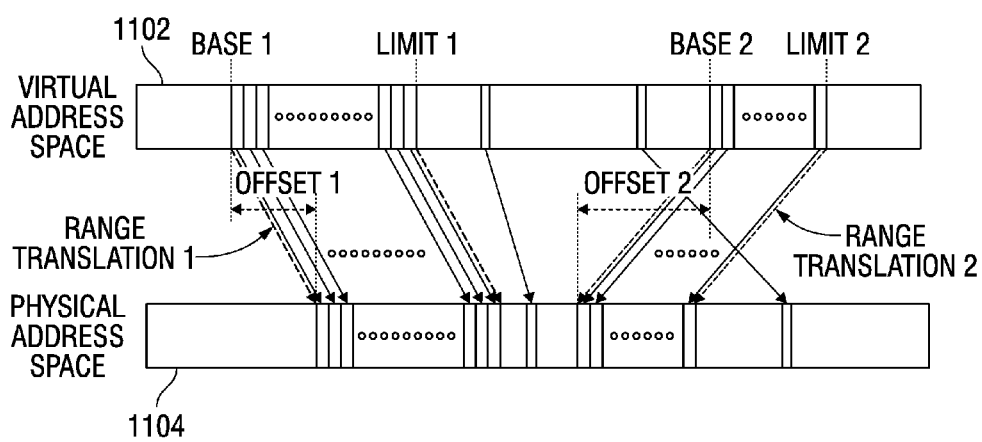
FIG. 10 illustrates an exemplary range translation of virtual addresses to physical addresses represented by a base and a limit.

The enhanced value range profiling technique may be used alone, as described above, or in a redundant memory mapping system. For example, referring to FIGS. 9, 10, and 11, the enhanced value range profiling technique improves performance of a redundant memory mapping technique by using ranges stored in base-limit registers 920, a virtual-to-physical address translation, as described above, and a redundant page table mapping of contiguous virtual addresses to contiguous physical addresses of redundant memory mapping system 1200.

Redundant memory mapping is a technique used to improve performance of paging systems that are limited by fixed translation lookaside buffer sizes. The redundant memory mapping technique maps portions of the address space with both range translations and pages. Redundant memory mapping uses a range table and range translation lookaside buffer in parallel with a last level page translation lookaside buffer. Since information stored in the range table is redundant to information stored in page tables, the system may use or revert to paging, as needed (e.g., in response to a miss in the range table). The redundant memory mappings store translation information for ranges of pages that are both physically and virtually contiguous and rely on range translation. Each range translation maps a contiguous virtual address range to contiguous physical pages using BASE, LIMIT, and OFFSET values to perform translation of an arbitrary sized range, as described above. The range translations are only base-page-aligned and redundant to paging, which includes a page table that maps the entire virtual address space.

FIG. 11 illustrates two exemplary ranges mapped redundantly using a conventional page table system as well as range translations. Redundant memory mapping system 1200 includes a range translation table 1202 accessed in parallel with the page table 1204. The paging memory management scheme is managed by software, e.g., an operating system or hypervisor executing on one or more cores of processing system 100, and stores and retrieves data from secondary storage (e.g., disk) in same size blocks called pages for use in main memory 110 of FIG. 8. Referring back to FIG. 11, the page table system has a four-level hierarchy of tables for memory mapping using multiple levels, e.g., page table (L1), page directory (L2), page directory pointer (L3), and page map level 4 (L4), which is the top table. However, other page table systems having different numbers of levels may be used. Page map level 4 provides a page directory pointer for a virtual address. Page directory pointer table (L3) provides the address of a page directory table (L2) using a page directory pointer. Page directory table (L2) provides the address of a corresponding page table (L1). The least significant bits of the virtual address are used as an offset in a page table to locate a target physical address within the page table. Fewer levels of page tables spanning the same virtual address space and physical address space may be used (e.g., huge pages implementations). Range table 1202 is managed by software executing on one or more cores of the associated processing system and stores information that is redundant to the information stored in page table system 1204, which stores mappings between virtual addresses and physical addresses.

In at least one embodiment, value processor 906 includes a virtual-to-physical address translator that performs address translation for frequently-accessed ranges of physical memory and implements range table 1202 using a limited set of base-limit registers. By generating the translation for the frequently accessed address ranges using the enhanced value range profiling technique described above, memory access time may be reduced. Since available base-limit registers are limited to M registers of the memory system, the number of ranges of memory addresses in the target set of memory address ranges should be no greater than the number of base-limit registers in value processor 906. Accordingly, the most frequently accessed ranges of virtual memory addresses are translated by value processor 906 into physical memory addresses that are stored as a base address and corresponding limit in each of base-limit registers 920. In response to a memory access, memory controller 108 may determine whether or not a virtual address is present in target set of value ranges 916, which is a fully associative cache memory. If the address is present, memory controller 108 accesses the corresponding translation from the base-limit registers 920 rather than performing the translation, thereby reducing memory latency due to address translation. If the virtual address is not included in the ranges of target set of value ranges 916, value processor 906 uses conventional page tables or other virtual-to-physical address translation techniques to determine the physical memory address.

Referring back to FIGS. 6, 8, and 9, in at least one embodiment, other applications of the enhanced value range profiling technique include adaptively tracking ranges of memory addresses (e.g., physical or virtual) in enhanced value range profiler 908 to identify large ranges of consecutive translations in target set of value ranges 916 that may be converted to large pages. Value processor 906 stores large ranges in base-limit register 920 by value processor 906. Those large pages allow multi-page mappings to use only one entry of a corresponding translation lookaside buffer, thereby reducing a required size of the translation lookaside buffer and allowing mapping of larger, fixed size ranges of memory. Base-limit registers 920 or other storage elements may be used to identify those large ranges of consecutive translations. The enhanced value range profiling technique may provide information stored in ranked list 912 or target set of value ranges 916 to system software (e.g., operating system, hypervisor, kernel, or other suitable software) for use in managing large pages of main memory 110.

In at least one embodiment, other applications of the enhanced value range profiling technique enhanced value range profiler 908 and value processor 906 include a memory controller that adaptively tracks ranges of memory addresses (e.g., physical or virtual) for allocation in a fast (e.g., last level cache) or a slow memory (e.g., main memory or disk) in a multi-level memory system. The counting capability of the range tracking mechanism, alongside with the feature for identification of large range access provides enough information for the system to allocate frequently-accessed ranges of pages in a multi-level memory system from main memory to faster memories, e.g., such as high bandwidth memory or N-level memory systems. An exemplary high bandwidth memory includes a stack of memory chips and associated ultra-fast memory interface that closely connect the memory chips to a processor using an interposer. In the resulting system, the high bandwidth memory performance is negligibly different from the performance of on-chip integrated RAM but expands the amount of available system storage.

In at least one embodiment of processing system 100 a last-level cache 106, memory controller 108, or other coherence circuitry includes a coherence system that ensures that data moved to or from the last-level cache 106 does not violate any coherency rules. For example, probe filter 109 applies coherency rules, e.g., no violation of race conditions between probes to a core and hit data being returned to the core, or between probes to the last-level cache and victim data from the cores being allocated into the last-level cache. Probe filter 109 performs collision detection of probes against last-level cache data movements before delivering probes to the core. Accordingly, probe filter 109 may include enhanced value range profiler 908, which adaptively tracks ranges of memory addresses (e.g., physical memory address ranges or virtual memory address ranges) to expedite coherence operations. Address ranges covering the area of memory that is occupied may be stored in target set of value ranges 916 utilized in snooping mechanisms to determine if memory coherence actions are necessary. A hit in target set of value ranges 916, which may be a fully associative memory, may indicate that multiple memory requests to the same memory address range by multiple different requestors. Accordingly, value processor 906 may include control logic to perform a coherence operation. Although the coherence circuitry is described as a probe filter, other embodiments of a processing system including coherence mechanisms may include enhanced value range profiler 908 and value processor 906 in other coherence systems.

Referring back to FIG. 6, in at least one embodiment of the enhanced profiling technique, event generator 902 is an instruction decoder and value processor 906 is a program counter address generator of a pipelined processing core. The events include control flow instructions being processed by the pipelined processing core. For example, the program counter address generator generates target instruction addresses for speculative or non-speculative instruction execution, conditional or non-conditional branch or jump instruction execution, or other instruction execution. The values are addresses of next instructions to be fetched from memory being processed by the core. The enhanced value range profiling technique identifies ranges of target addresses having high frequency access and the execution unit (instruction fetch unit) may base branch prediction and speculative instruction decisions on those ranges of target addresses that have high frequency access stored in target set of value ranges 916 (e.g., greater than a predetermined number) to speed up processor operation.

In at least one embodiment, event generator 902 is an instruction decoder of a pipelined processor core, and value processor 906 is an arithmetic logic unit, floating point unit, or other suitable execution unit of the pipelined processor core. The events are arithmetic or logic instructions being processed by the execution unit, and the values are corresponding data operands being processed by an execution unit of the core. The enhanced value range profiling technique identifies ranges of data operands having high frequency access and the execution unit may predict results based on the ranges of data operands that have high frequency access, thereby decreasing computation time of the associated execution unit and increasing performance of the associated processing system. The enhanced value range profiling technique may be used to enable speculative execution and/or low-power operation in applications in which reduced precision is acceptable as a tradeoff for increased execution speed and/or decreased power consumption.

Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other non-transitory magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a particular processor and memory architecture is used, one of skill in the art will appreciate that the teachings herein can be utilized with other processor and memory system architectures using different caching schemes and coherence protocols. Variations and modifications of the embodiments disclosed herein, may be made based on the description set forth herein, without departing from the scope of the invention as set forth in the following claims.

What is claimed is:

1. A method comprising:
    adaptively profiling ranges of memory addresses in a stream of memory requests in a processing system to identify a set of contiguous ranges of the memory addresses and corresponding access frequencies in the stream of memory requests, the adaptively profiling being based on a merge threshold value and a split threshold value, the set of contiguous ranges spanning an entire range space of the memory addresses, the merge threshold value indicating a minimum access frequency for each range of the memory addresses in the set of contiguous ranges of the memory addresses, and the split threshold value indicating a maximum access frequency for each range of the memory addresses in the set of contiguous ranges of the memory addresses;
    periodically traversing the set of contiguous ranges of the memory addresses and corresponding access frequencies to identify a target set of ranges of the memory addresses having corresponding access frequencies above a predetermined threshold access frequency, the target set of ranges of the memory addresses having a total number of ranges less than or equal to a predetermined number of ranges and ranges of the target set of ranges of the memory addresses spanning at least some of the entire range space of the memory addresses; and
    performing a first operation using ranges of the memory addresses in the target set of ranges of the memory addresses,
    wherein the memory addresses are virtual memory addresses, and the first operation comprises:
        virtual-to-physical memory address translation of the target set of ranges of the memory addresses into a set of physical address ranges determined based on a base address value and a limit value; and
        storing the set of physical address ranges as corresponding base address value and limit value pairs in a set of base-limit registers, the predetermined number of ranges corresponding to a total number of base-limit registers in the set of base-limit registers.

2. The method, as recited in claim 1, wherein the target set of ranges of the memory addresses spans less than the entire range space of the memory addresses.

3. The method, as recited in claim 1, wherein the target set of ranges of the memory addresses includes non-contiguous ranges of the memory addresses.

4. The method, as recited in claim 1, wherein the first operation further comprises:
    converting consecutive ranges of the target set of ranges of the memory addresses into address ranges for large pages of memory.

5. The method, as recited in claim 1, wherein the first operation further comprises allocating contents of main memory associated with the target ranges of the memory addresses to a high-bandwidth memory in a multilevel memory system.

6. The method, as recited in claim 1, wherein performing the first operation comprises:
    identifying multiple memory requests to a memory address by multiple requestors; and
    executing a coherence operation in response to the multiple requests.

7. The method, as recited in claim 6, wherein executing the coherence operation includes invalidating a cache line corresponding to the memory address.

8. An apparatus comprising:
    an adaptive range profiler configured to adaptively profile ranges of memory addresses in a stream of memory requests in a processing system to identify a set of contiguous ranges of the memory addresses and corresponding access frequencies in the stream of memory requests, the adaptively profiling being based on a merge threshold value and a split threshold value, the set of contiguous ranges spanning an entire range space of the memory addresses, the merge threshold value indicating a minimum access frequency for each range of the memory addresses in the set of contiguous ranges of the memory addresses, and the split threshold value indicating a maximum access frequency for each range of the memory addresses in the set of contiguous ranges of the memory addresses;
    range coalescing and culling logic configured to periodically traverse the set of contiguous ranges of the memory addresses and corresponding access frequencies to identify a target set of ranges of the memory addresses having corresponding access frequencies above a predetermined threshold access frequency, the target set of ranges of the memory addresses having a total number of ranges less than or equal to a predetermined number of ranges and ranges of the target set of ranges of the memory addresses spanning at least some of the entire range space of the memory addresses; and
    logic configured to perform a first operation using ranges of the memory addresses in the target set of ranges of the memory addresses,
    wherein the logic comprises:
        a virtual-to-physical address translator configured to perform the first operation including translation of the target set of ranges into a set of physical addresses having a base memory address and a limit value;

a set of base-limit registers configured to store the set of physical address ranges, the predetermined number of ranges corresponding to a total number of base-limit registers in the set of base-limit registers.

9. The apparatus, as recited in claim 8, wherein the target set of ranges of the memory addresses spans less than the entire range space of the memory addresses and the target set of ranges of the memory addresses includes non-contiguous ranges of the memory addresses.

10. The apparatus, as recited in claim 8, further comprising:
a page table including memory mappings redundant to the memory mappings of the set of base-limit registers.

11. The apparatus, as recited in claim 8, wherein
the first operation further includes translation of consecutive ranges of the target set of ranges into addresses for large pages of memory.

12. The apparatus, as recited in claim 8, further comprising:
a high-bandwidth memory, wherein the first operation further includes allocating contents of main memory associated with the target ranges of the memory addresses to the high-bandwidth memory.

13. The apparatus, as recited in claim 8, wherein the logic is configured to identify multiple memory requests to a memory address by multiple requestors and execute a coherence operation in response to the multiple requests.

14. A method comprising:
adaptively profiling ranges of data values in a stream of events in a processing system to identify a set of contiguous ranges of the data values and corresponding access frequencies in the stream of events, the adaptively profiling being based on a merge threshold value and a split threshold value, the set of contiguous ranges of the data values spanning an entire range space of the data values, the merge threshold value indicating a minimum access frequency for each range of the data values in the set of contiguous ranges of the data values, and the split threshold value indicating a maximum access frequency for each range of the data values in the set of contiguous ranges of the data values;
periodically traversing the set of contiguous ranges of the data values and corresponding access frequencies to identify a target set of ranges of the data values having corresponding access frequencies above a predetermined threshold access frequency, the target set of ranges of the data values having a total number of ranges less than or equal to a predetermined number of ranges and ranges of the target set of ranges of the data values spanning at least some of the entire range space of the data values; and
performing a first operation using ranges of the data values in the target set of ranges of the data values,
wherein the stream of events comprises a stream of control flow instructions or a stream of data computation instructions,
wherein when the stream of events comprises the stream of control flow instructions, the data values include target program addresses and the performing the first operation includes predicting a target program address for a corresponding control flow instruction,
wherein when the stream of events comprises the stream of data computation instructions, the data values include data operands, and the performing the first operation includes predicting a value of an output of a data computation based on one or more of the data operands.

15. The method, as recited in claim 14, wherein the target set of ranges of the data values spans less than the entire range space of the data values and the target set of ranges of the data values includes non-contiguous ranges of the data values.

16. The method, as recited in claim 14, wherein the stream of events further comprises a stream of memory requests and the data values include memory addresses.

17. The method, as recited in claim 14, wherein the stream of events is a stream of control flow instructions, the data values are target program addresses and the performing the first operation includes predicting a target program address for a corresponding control flow instruction.

18. The method, as recited in claim 14, wherein the stream of events is a stream of data computation instructions, the data values are data operands, and the performing the first operation includes predicting a value of an output of a data computation based on one or more of the data operands.

* * * * *